(12) United States Patent
Sobczyk

(10) Patent No.: US 10,449,613 B2
(45) Date of Patent: Oct. 22, 2019

(54) METHOD AND DEVICE FOR FORMING TEETH IN A WORKPIECE GEAR WITH REDUCED FLANK LINE SHAPE ERROR

(71) Applicant: Profilator GmbH & Co. KG, Wuppertal (DE)

(72) Inventor: Marcel Sobczyk, Solingen (DE)

(73) Assignee: Profilator GmbH & Co. KG, Wuppertal (DE)

( * ) Notice: Subject to any disclaimer, the term of this patent is extended or adjusted under 35 U.S.C. 154(b) by 61 days.

(21) Appl. No.: 15/560,875

(22) PCT Filed: Mar. 23, 2016

(86) PCT No.: PCT/EP2016/056308
§ 371 (c)(1),
(2) Date: Sep. 22, 2017

(87) PCT Pub. No.: WO2016/150985
PCT Pub. Date: Sep. 29, 2016

(65) Prior Publication Data
US 2018/0117692 A1    May 3, 2018

(30) Foreign Application Priority Data

Mar. 23, 2015   (DE) .................. 10 2015 104 310

(51) Int. Cl.
*B23F 5/16*    (2006.01)
*B23F 23/10*   (2006.01)
(Continued)

(52) U.S. Cl.
CPC ............. *B23F 23/10* (2013.01); *B23F 5/16* (2013.01); *B23F 5/163* (2013.01); *B23F 23/12* (2013.01);
(Continued)

(58) Field of Classification Search
CPC .... B23C 5/02; B23F 1/06; B23F 5/163; B23F 9/10; B23F 9/14; B23F 9/105; B23F 9/12;
(Continued)

(56) References Cited

U.S. PATENT DOCUMENTS 3,049,978 A * 8/1962 Rubenson ................ G01B 5/20
                                                        209/598
4,689,918 A * 9/1987 Loos ........................ B23F 19/052
                                                         409/2

(Continued)

FOREIGN PATENT DOCUMENTS

DE         3915976 A1    11/1990
DE        19631620 A1     2/1998
(Continued)

OTHER PUBLICATIONS

PCT International Search Report & Written Opinion Application No. PCT/EP2016/056308 Completed Date: May 31, 2016; dated Jun. 7, 2016 11 Pages.

(Continued)

*Primary Examiner* — Nicole N Ramos
(74) *Attorney, Agent, or Firm* — Whitmyer IP Group LLC

(57) ABSTRACT

A method for producing a toothed workpiece gear, wherein the workpiece gear is clamped or fastened to a workpiece spindle, and a cutting tool having cutting teeth is clamped or fastened to a tool spindle. The tool spindle and the workpiece spindle are rotationally driven at a coupling ratio of the angles of rotation thereof having a periodic non-linearity or an axial distance from each other that changes periodically. The cutting teeth machine forms left and right tooth flanks of the teeth of the workpiece gear using left and right cutting edges in a chip-removing manner. A radial run-out error or a pitch error of the cutting tool is determined. The flank line shape errors of the right and left tooth flank resulting from (Continued)

the radial run-out error or the pitch error are reduced by the periodic non-linearity of the coupling ratio or the periodic change in the axial distance.

8 Claims, 6 Drawing Sheets

(51) Int. Cl.
   *B23F 23/12* (2006.01)
   *B23Q 17/09* (2006.01)
   *B23Q 17/00* (2006.01)
   *B23F 21/16* (2006.01)
(52) U.S. Cl.
   CPC ...... *B23F 23/1243* (2013.01); *B23Q 17/0914* (2013.01); *B23F 21/16* (2013.01); *B23Q 2017/001* (2013.01)
(58) Field of Classification Search
   CPC ........ B23F 21/22; B23F 21/223; B23F 21/04; B23F 21/046; Y10T 409/103816; Y10T 409/103975; Y10T 409/104134; Y10T 409/104293; Y10T 409/10477; Y10T 409/105088; Y10T 409/105124; Y10T 409/106201; Y10T 409/106837
   See application file for complete search history.

(56) References Cited

U.S. PATENT DOCUMENTS

| | | | |
|---|---|---|---|
| 5,136,522 A | | 8/1992 | Loehrke |
| 5,580,298 A * | 12/1996 | Stadtfeld | ................... B23F 9/00 451/1 |
| 5,761,067 A * | 6/1998 | Alford | ................ B23F 23/1218 700/160 |
| 5,895,180 A * | 4/1999 | Stadtfeld | ............... B23F 21/226 407/22 |
| 8,596,939 B2 * | 12/2013 | Prock | ..................... B23F 5/163 29/56.5 |
| 2009/0028655 A1 * | 1/2009 | Ribbeck | ................ B23F 17/003 409/27 |
| 2013/0051948 A1 * | 2/2013 | Masuo | ..................... B23F 5/04 409/38 |

FOREIGN PATENT DOCUMENTS

| | | |
|---|---|---|
| DE | 102005049528 A1 | 5/2007 |
| DE | 102008037514 A1 | 5/2010 |
| DE | 102008037578 A1 | 5/2010 |
| DE | 102009003601 A1 | 9/2010 |
| DE | 102011108972 A1 | 1/2013 |
| DE | 102012012174 A1 | 12/2013 |
| DE | 102013003585 A1 | 9/2014 |
| EP | 1319457 A2 | 6/2003 |
| EP | 2570217 A1 | 3/2013 |
| WO | 2014034495 A1 | 3/2014 |

OTHER PUBLICATIONS

Translation of International Search Report Application No. PCT/EP2016/056308 Completed Date: May 31, 2016; dated Jun. 7, 2016 3 Pages.

* cited by examiner

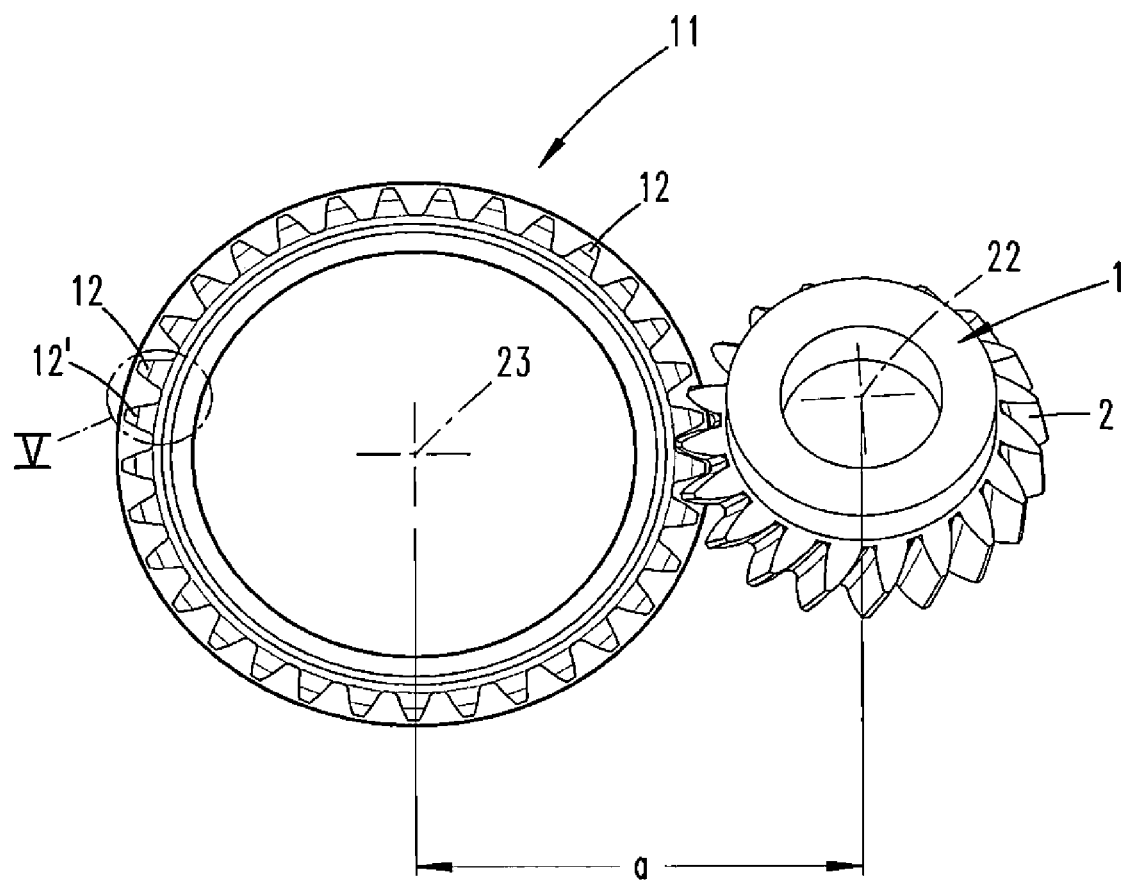

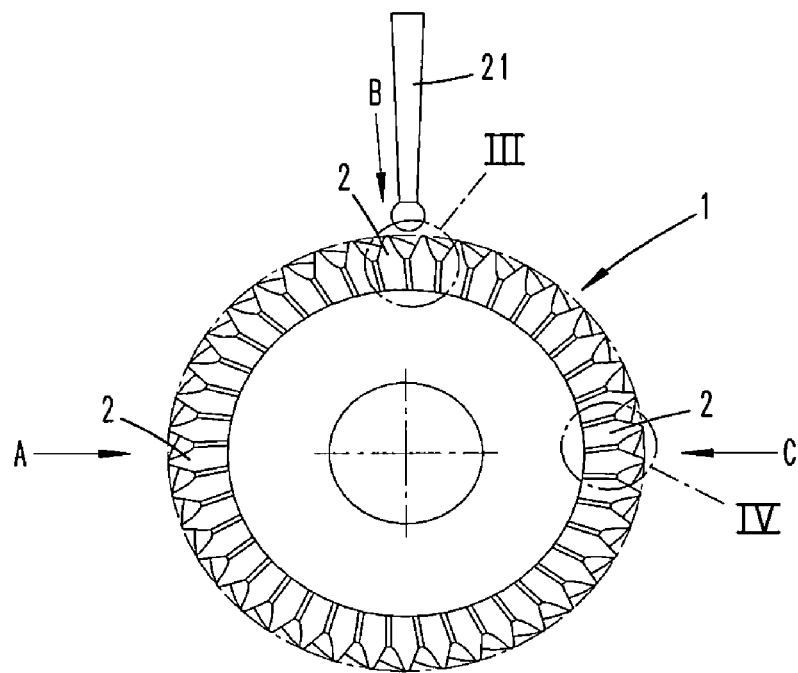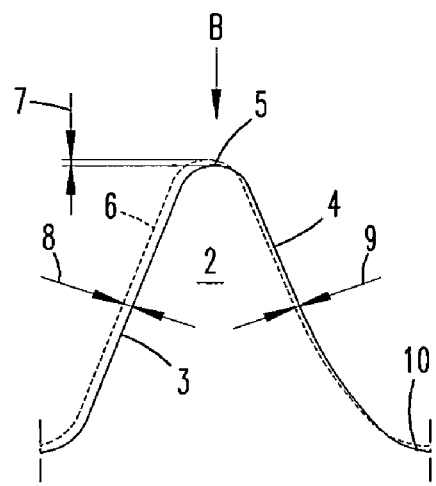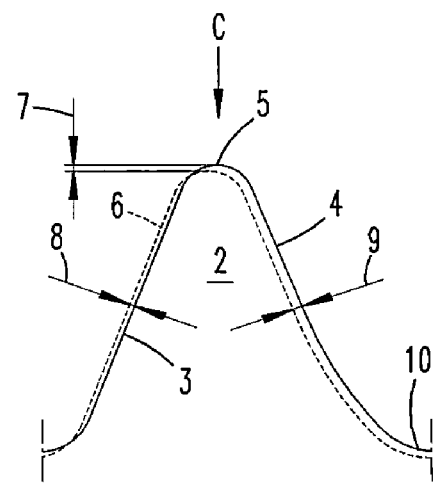

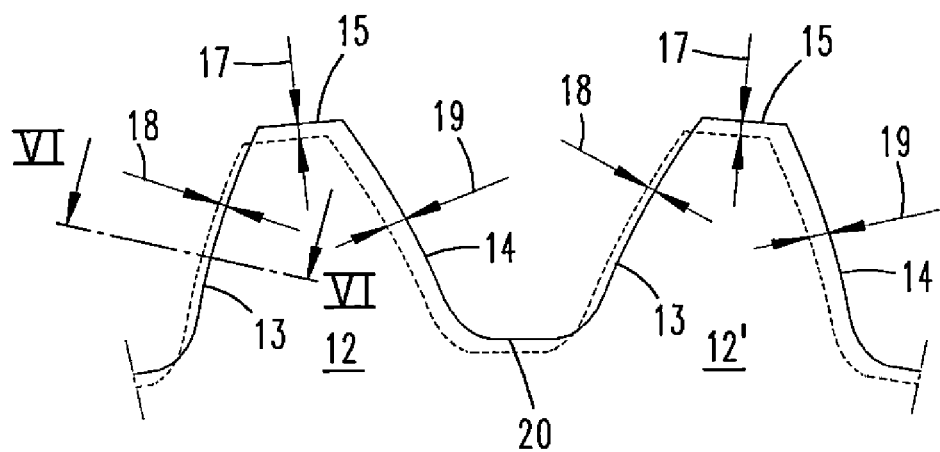
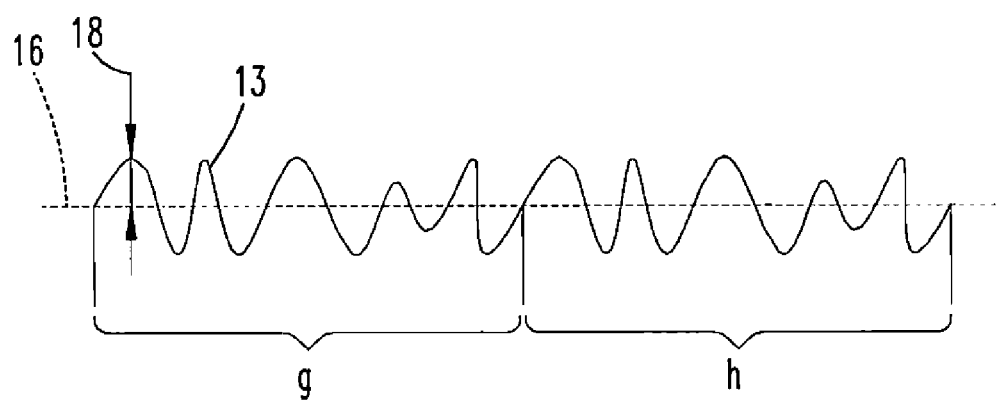

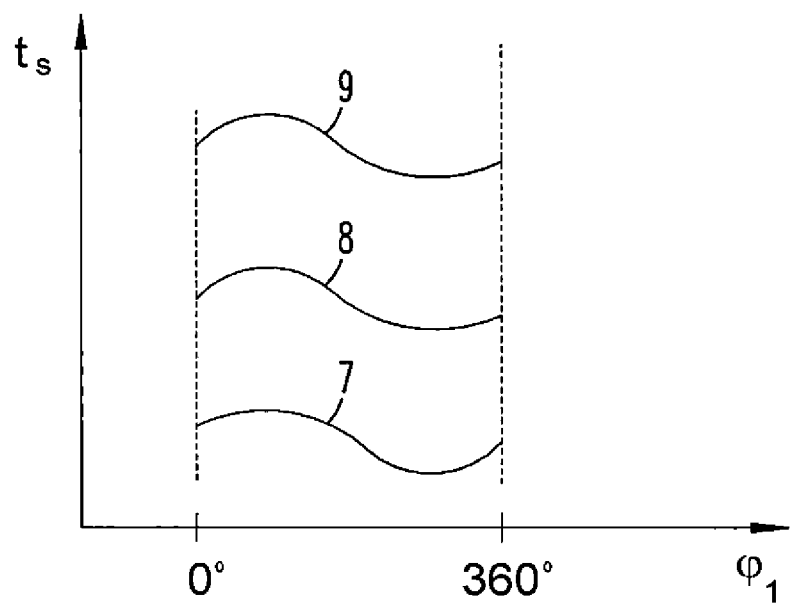
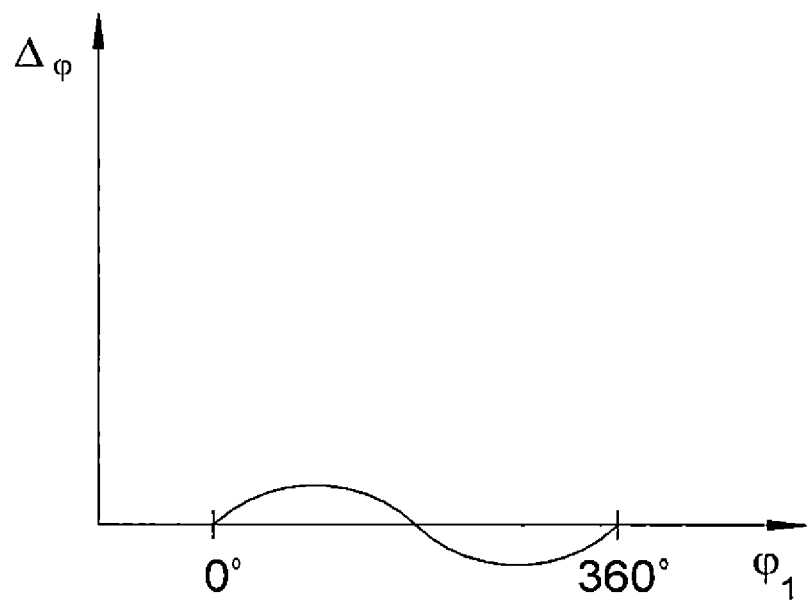

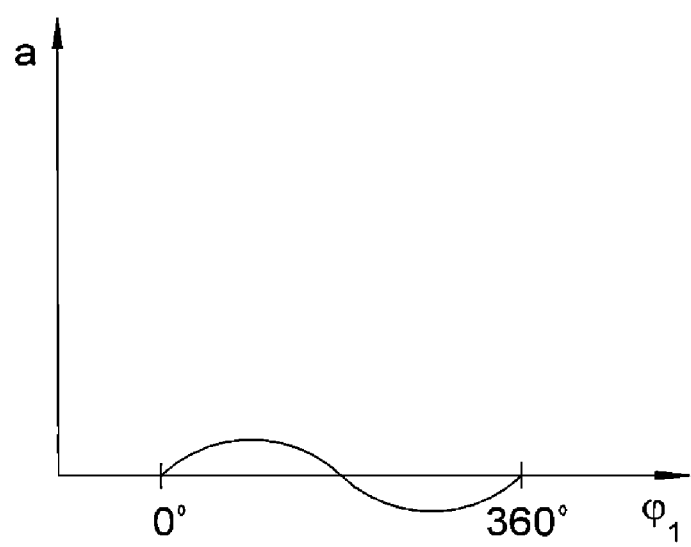

METHOD AND DEVICE FOR FORMING TEETH IN A WORKPIECE GEAR WITH REDUCED FLANK LINE SHAPE ERROR

TECHNICAL FIELD

The invention relates to a method for producing a toothed workpiece gear, wherein the workpiece gear is clamped or fastened to a workpiece spindle and wherein a cutting tool having cutting teeth is clamped or fastened to a tool spindle. The tool spindle and the workpiece spindle are rotationally driven at a coupling ratio of the angles of rotation thereof having a periodic non-linearity and/or at an axial distance from each other that changes periodically, and the cutting teeth machine forms left and right tooth flanks of the teeth of the workpiece gear by means of left and right cutting edges in a chip-removing manner, wherein a radial run-out error and/or a pitch error of the cutting tool is determined before the workpiece is machined and the flank line shape errors of the right and/or left tooth flank resulting from the radial run-out error and/or the pitch error are reduced by means of the periodic non-linearity of the coupling ratio and/or by means of the periodic change in the axial distance.

BACKGROUND

The invention furthermore relates to a device for carrying out the method, which has a control device comprising a workpiece spindle for clamping the workpiece gear and a tool spindle for clamping the cutting tool and comprising a control device, which is equipped in such a way that the tool spindle and the workpiece spindle can be rotationally driven at a coupling ratio of the angles of rotation thereof having a periodic non-linearity and/or at an axial distance from each other that changes periodically, so that the cutting teeth machine forms left and right tooth flanks of the teeth of the workpiece gear by means of left and right cutting edges in a chip-removing manner, wherein the control device is equipped in such a way that, by means of a radial run-out error and/or pitch error, which is determined before the workpiece is machined, of the cutting tool, which is connected to the tool spindle, the workpiece spindle and the tool spindle can be driven with the periodically non-linear coupling ratio and/or the axial distance can be changed periodically to reduce the flank line shape errors of the right and left tooth flanks resulting from the radial run-out error and the pitch error.

A method for compensating a radial tool run-out deviation is known from DE 10 2012 012 174 A1, in the case of which the radial tool run-out deviation is determined as a function of a rotational position of a tool axis. In addition, a rotational position of the rotational axis of the tool is determined. A compensating movement is carried out in order to compensate the radial tool run-out deviation. The compensating movement is a function of the radial tool run-out deviation, which is assigned to the determined rotational position.

Machine tools are further known from DE 10 2009 003 601 A1, DE 10 2008 037 514 A1, DE 10 2008 037 578 A1 and from DE 10 2005 049 528 A1, in each case described in the form of hobbing or hob peeling tools.

DE 196 31 620 A1, DE 10 2011 108 972 A1 and EP 1 319 457 A2 deal with the problem that workpieces can be clamped concentrically and in a tilt-free manner into the workpiece accommodating chuck only with significant effort. The publications describe sensor for measuring the relative position of the axes of the workpiece, based on the axis of rotation of the workpiece accommodation, by means of which the axial offset of the contour axis of the workpiece with respect to the axis of rotation of the workpiece spindle and a tilt of the contour axis of the workpiece with respect to the workpiece spindle axis can be determined. An electronic wobble compensation of the machining coupling is proposed in the form of corrective movements of the tool during the machining, in order to compensate the misalignment of the workpieces in this way.

A generic machine tool has a machine housing or machine frame, which supports a workpiece spindle and a tool spindle. The tool spindle and the workpiece spindle can be offset relative to one another, so that the axis cross angle of the tool spindle axis and of the workpiece spindle axis, and the axial distance of the two axes can be adjusted. The two spindles have chucks for accommodating a tool and a workpiece, the teeth of which are to be formed. The tool spindle axis and the workpiece spindle axis are in each case operated by an electronically controlled motor arrangement. They are electronically synchronized electric individual drives. The synchronization occurs by means of a control device, which is equipped in such a way that the two spindles are rotationally driven relative to one another at a predetermined speed ratio. A cutting wheel provided with cutting teeth engages with the workpiece gear, the teeth of which are to be formed. By means of machining, tooth gaps of an inner or an outer toothing are incorporated into the blank. The number of teeth of the workpiece gear and the number of teeth of the cutting tool thereby differ from one another in such a way that a certain tooth of the cutting wheel enters into the same tooth gap only after a repeated rotation of the cutting wheel. A cutting wheel, the number of teeth of which is adapted to the number of teeth of the workpiece gear in such a way that the first entrance of a certain tooth into the same tooth gap takes place again after a number of rotations of the cutting wheel, which corresponds to the number of teeth of the cutting wheel, is preferably used to form the teeth of a workpiece gear.

SUMMARY

In the case of this method, the improvement of which is the object of the invention, the left and right tooth flanks of the workpiece gear have periodic flank line shape errors, which run in the tooth flank direction of extension and which result from the fact that cutting teeth of the cutting wheel, which enter consecutively into the same tooth gap of the workpiece gear, are located far apart from one another in the circumferential direction of the cutting wheel. An error-free production of the cutting wheel is not possible with the means of the prior art. It can thus not be avoided that the cutting teeth of the cutting wheel have radial run-out errors and that the cutting edges of the cutting teeth have pitch errors. Based on an angle position, in the case of which an error zero value is defined, the radial run-out error and the pitch errors of the left and right cutting edge generally has and have a maximum on a circumferential position and a minimum in a position, which is offset thereto. In general, the pitch errors vary there between on a smooth curve, so that the radial run-out error or the pitch errors can be depicted as circular function (sine, cosine) in a first approximation. Due to the fact that from experience, directly adjacent teeth of the cutting wheel on principle do not consecutively enter into the same tooth gap of the workpiece wheel, the above-mentioned flank line shape errors develop.

These flank line shape errors resulting from the radial run-out error or the pitch errors of the tool are to be avoided by means of the method according to the invention or by means of the device according to the invention by means of a periodic relative rotation of workpiece spindle and tool spindle or by means of a periodic change of the axial distance of the workpiece spindle axis relative to the tool spindle axis. In the case of the prior art, the coupling ratio of the angles of rotation of the workpiece gear relative to the angle of rotation of the tool wheel gear is modified by means of corrective movements of the tool in order to compensate a misalignment of the workpiece. Without such compensation, the depiction of the two angles of rotation in a diagram would be a straight line, the incline of which corresponds to the speed ratio. A periodically changing speed ratio is attained by means of a periodic non-linearity of the coupling ratio. The tooth flank, which leads the tooth flank in the direction of rotation of the nominal contour, engages with the assigned tooth flank of the tooth of the workpiece gear in a time-delayed manner. The cutting edge, which is recessed with respect to the nominal contour of the cutting edge in the direction of rotation, engages with the tooth flank of the tooth of the workpiece gear assigned thereto so as to be advanced in time. The illustration of the ratio of the two angles of rotation in a diagram is thus a curve, which differs from a straight line, which in particular has periodicities. In the alternative or in combination thereto, the actuators for adjusting the axial position of tool spindle or workpiece spindle are displaced by the control device of the machine tool in such a way that the axial distance for compensating the radial run-out error changes periodically. This occurs in response to the production of internally toothed workpieces as well as in response to the production of externally toothed workpieces. At the rotational position, at which a cutting tooth, which protrudes radially with respect to the nominal contour, engages with the workpiece gear, the axial distance has an increased value. At the rotational position of the tool, at which a cutting tooth, which is shifted radially inwards, engages with the workpiece gear, the axial distance is slightly reduced. In response to the production of internal toothing, the axial distance is then slightly increased at best. The period length of the modification of the coupling ratio or of the modification of the axial distance can correspond to the speed of the cutting wheel. However, the period length can also be half as long or can be 1 n-th of the speed of the tool spindle.

According to the invention, the radial run-out errors and the pitch errors of the cutting wheel, which is clamped onto the workpiece spindle, are determined. For this purpose, provision is made on the machine housing or on the machine frame for a corresponding measuring tool. In addition to the errors of the cutting tool, clamping errors and radial run-out errors of the tool spindle are additionally considered through this. The method according to the invention can be carried out in response to a rough machining of the workpiece gear, thus in response to the teeth forming itself. However, provision is preferably made for the speed ratio compensation or the axial distance compensation to take place in response to a fine machining, for example in response to a finishing step. The speed ratio combination preferably takes place exclusively in response to the fine machining or in response to a finishing step. While the left and the right tooth flanks are machined simultaneously in response to the rough machining, a separation can be made in response to a fine machining, so that the left and the right tooth flank are in each case machined separately in consecutive operating steps. In response to this fine machining, left and right pitch errors can be considered separately. The method according to the invention is used in particular in response to the hob peeling of gear wheels, in the case of which a tooth wheel-shaped cutting wheel is used, which is rotationally driven at an axis cross angle to the workpiece gear. The advance is thereby made in the direction of extension of the teeth of the workpiece gear, which are toothed in a beveled or straight manner. Preferably, electronically synchronized electric individual drives are used, which can be regulated at a frequency of up to 150 Hz.

The device according to the invention has a control device, which can execute control commands according to a control program. The control program includes the above-mentioned method steps, so that the machine tool according to the invention is equipped in such a way that it operates according to the described method.

The radial run-out errors of the left as well as the radial run-out errors of the right cutting edge are measured by means of the method according to the invention and are in each case avoided separately by means of corrective movements. As an alternative thereto, however, a radial run-out error of the head cutting edge can on principle also be determined and can be compensated separately. For this purpose, a machine tool according to the invention has a measuring tool, which is fixedly assigned to the machine frame.

BRIEF DESCRIPTION OF THE DRAWINGS

An exemplary embodiment of the invention will be explained below by means of enclosed drawings.

FIG. 1 shows a workpiece gear 11, which is rotationally driven about an axis of rotation 23 with the help of a non-illustrated workpiece spindle, and a cutting wheel 1, which can be rotationally driven about an axis of rotation 22 of a non-illustrated tool spindle.

FIG. 2 shows a front side view of the cutting wheel 1 comprising a measuring device 21.

FIG. 3 shows a tooth in the section III of FIG. 2 at a location B of the cutting wheel 1.

FIG. 4 shows a tooth in the section IV of FIG. 2 at a location C of the cutting wheel 1.

FIG. 5 shows the section V of the workpiece gear 11 in FIG. 1.

FIG. 6 shows the section according to the line VI-VI along a tooth flank in FIG. 5, wherein the surface profile of the tooth flank is reproduced in a highly enlarged manner in the tooth extension direction.

FIG. 7 shows the radial run-out error 7, the pitch error 8 of the left cutting edge 3, the pitch error 9 of the right cutting edge 4 across the circumference of the cutting wheel 1, in a highly enlarged manner.

FIG. 8 shows the correction value of the angle of rotation $\varphi_1$ of the cutting wheel 1, which is simplified as sine function, in a highly enlarged manner.

FIG. 9 shows the correction value of the axial distance a for a rotation of the cutting wheel 1, which results from the radial run-out error 7 and which is simplified as sine function, in a highly enlarged manner.

DETAILED DESCRIPTION

Figure 10:
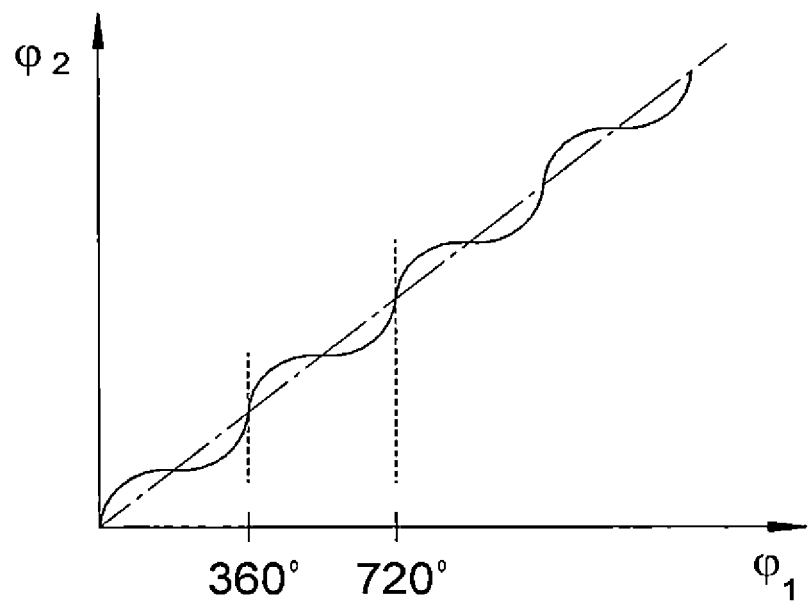
FIG. 10 shows the coupling ratio of the angle of rotation $\varphi_1$ of the cutting wheel 1 to the angle of rotation $\varphi_2$ of the workpiece gear for correcting the left pitch error 8, in a highly enlarged manner.

The device described below is a machine tool, which has a housing or a machine frame, as it is known in the prior art, which is why neither the machine frame nor the tool spindle and workpiece spindle, which are attached thereto, are illustrated. The machine tool has the known electric drive means in order to adjust and to change the inclined position of a tool spindle or of a workpiece spindle and the axial distance of tool spindle to workpiece spindle. The machine tool furthermore has at least two electric individual drives, which are electronically synchronized, and which are in each case assigned to the workpiece spindle or to the tool spindle. Provision is made for a control device, by means of which the axial drives are controlled or synchronized. The control device is able to influence the speed ratio of workpiece spindle to tool spindle at a control frequency of up to 150 Hz. The tool axis rotates at a speed of 400 U/min, for example. The speed of the workpiece spindle is reduced by the ratio of the number of teeth of the workpiece to the number of teeth of the tool. A traversing of the workpiece, after the same cutting tooth 2 of the cutting wheel 1 dips into the same gap between two teeth 12, 12' of the workpiece gear 11, corresponds to a number of rotations of the cutting wheel, which corresponds to the number of teeth of the cutting wheel.

FIG. 1 shows a cutting wheel 1 in the form of a hob peeling wheel with radially protruding cutting teeth 2, which are distributed substantially evenly across the circumference. The axis of rotation 22 of the cutting wheel 1 is located at a predetermined axis cross angle to the axis of rotation 23 of the workpiece gear 11. The cutting teeth 2 in each case engage with a tooth gap between two teeth 12, 12' of the workpiece gear 11 in a chip-removing manner. Left tooth flanks 13 and right tooth flanks 14 of the tooth 12 are produced by means of a feed in response to a straight toothing in the direction of the axis of rotation 23 of the workpiece gear 11. Left cutting edges 3 and right cutting edges 4 of the cutting tooth 2 of the cutting wheel 1 thereby engage with the tooth gap.

The cutting tooth 2 at the marking A defines an arbitrary zero position of the radial run-out errors 7, of the left pitch error 8 and of the right pitch error 9. The enlarged illustrations of the teeth 2 at the positions B, C in FIG. 2 and in FIGS. 3, 4 illustrate the radial run-out error 7 as well as the pitch error 8 of the left cutting edge 3 and the pitch error 9 of the right cutting edge 4 qualitatively. The cutting edges 3, 4 of the cutting tooth 2 as well as the head cutting edges 5 and the bottom edge 10 are illustrated by means of a continuous line. The exact nominal contour of the cutting tooth 2 is illustrated by means of the dashed line 6. The deviations of the nominal contour line 6 from the cutting edges 3, 4 form a left pitch error 8 and a right pitch error 9. The qualitative size of the pitch errors 8, 9 runs approximately along a sine function, starting at the position A across positions B and C across the entire circumference of the cutting wheel 1. The sinusoidal course with a sine periodicity of the circumferential length of the cutting wheel 1, however, is only a first approximation.

The radial run-out error 7 can also be approximated as a circular arc period across the circumference of the cutting wheel 1.

In the case of the machining technique illustrated in FIG. 1, directly adjacent teeth 2 of the cutting wheel, which only differ slightly with respect to their pitch errors, do not consecutively engage with the same tooth gap of the workpiece gear 11. This is a function of the gear ratio. If, for example, a cutting wheel having 30 teeth engages with a workpiece gear having 31 teeth, the engagement sequence of the tool is 1, 2, 3, 4, . . . , 30, 31, 1, 2 . . . . Directly adjacent teeth 12, 12' of workpiece gear 11 have similar head errors 17 in a cross-sectional plane and left or right flank errors 18, 19, respectively, as it is illustrated in FIG. 5. Due to the fact that the cutting teeth 2, which consecutively engage with the same tooth gap, are located offset from one another across a large circumferential angle of the cutting wheel 1, these teeth have radial run-out errors 7, which differ strongly from one another, as well as pitch errors 8, 9. This leads to the flank line errors 18, which are illustrated in a highly exaggerated manner in FIG. 6. These are deviations of the tooth flank contour line 13, which oscillate to some extent from the straight nominal line profile 16 from one cut to another. The tooth flank course g is the course, within which the workpiece gear 11 is pushed forward within a traversal with respect to the cutting wheel 1. The flank line error 13 thus repeats itself within the tooth flank courses g, h.

Figure 11:
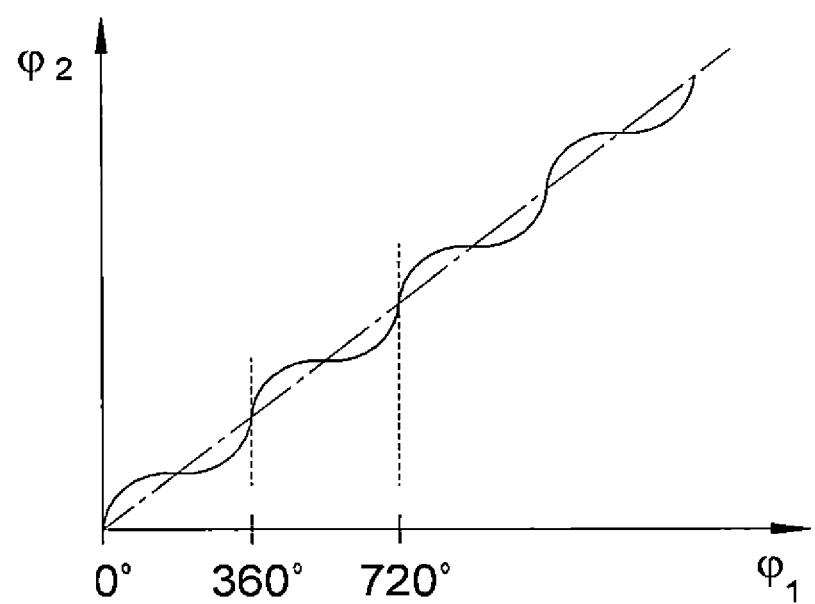
FIG. 11 shows the coupling ratio of the angle of rotation $\varphi_1$ of the cutting wheel 1 to the angle of rotation $\varphi_2$ of the workpiece gear 11 for compensating the right pitch error 9 in a highly enlarged manner.

The above-described errors occur, when the speed of the cutting wheel 1 is at a fixed ratio to the speed of the workpiece gear 11, thus when the coupling ratio of the angles of rotation $\varphi_1$, $\varphi_2$ from the cutting wheel 1 and workpiece gear 11 is a straight line, as it is illustrated in FIGS. 10 and 11 by means of a dot dashed line.

The deviation of the position of the head cutting edge 5, of the left cutting 3 and of the right cutting edge 4 of each cutting tooth 2 from the ideal contour 6 is measured by means of the method according to the invention by means of a measuring arrangement 21, which is fastened to the machine frame or machine housing. The measuring arrangement can be brought into contact with the tool via corresponding positioning axes. The spatial position of the left cutting edges 3 and of the right cutting edges 4 of each cutting tool 2 is measured. The cutting wheel 1 is thereby clamped into the chuck of the tool spindle with the unavoidable radial run-out error and tilt error, if applicable. What results are the three measuring curves illustrated in FIG. 7, which, merely qualitatively have a course, which approximately follows a trigonometric function, across the entire circumference of the cutting wheel 1. It can be gathered from FIG. 7 that the curves can have a differing course.

An angle-compensating function, which is illustrated in FIG. 8, is in each case formed from the measuring curves of the pitch error 8 of the left cutting edge 3 and of the pitch error 9 of the right cutting edge 4. For the sake of simplicity, the angle-compensating function has a sine wave pattern here. An angle of rotation correction value A, about which the cutting wheel 1 must either lead with respect to the workpiece wheel 11 or must trail, when the respective cutting tooth 2 is in cutting engagement results for each tooth along the circumferential line of between 0 and 360° of the cutting wheel 1. A modified coupling ratio of the angles of rotation $\varphi_1$, $\varphi_2$ from the cutting wheel 1 and workpiece gear 11 or tool spindle and workpiece spindle, respectively, as it is specified in FIG. 10 for the compensation of the pitch error 8 of the left cutting edge 3 and in FIG. 11 for compensating the pitch error 9 of the right cutting edge 4, results from this. The deviations from the straight line are illustrated in a highly exaggerated manner for clarification purposes. It can be seen that the compensation is a periodic non-linearity of the coupling ratio, wherein, in the simplest case, the period length corresponds to the circumferential angle of the cutting wheel 1. Corrections of a higher order are possible as well in that shorter period lengths, for example 1/N-th of the circumferential angle are used.

To compensate the head errors 17, the axial distance a of tool spindle and workpiece spindle is changed periodically according to FIG. 9, wherein the period length also corresponds to the circumference of the cutting wheel 1 here. For the sake of simplicity, the correction value also has the course of a sine function here. Corrections of a higher order are possible here as well.

A full tooth formation (course and fine tooth formation in one clamping process) of a workpiece gear 11 can be made by means of the machine tool according to the invention and the cutting wheel 1, which, according to the invention, is driven via corrective movements. For this purpose, a prepared, in particular rotationally symmetrical, untoothed blank is clamped into the chuck of the workpiece spindle. In the case of a full tooth formation according to the invention, the problems discussed in the prior art, namely having to compensate a radial run-out error or a tilt error of the workpiece, do not occur. The rough tooth formation of the workpiece wheel produced by means of the method according to the invention is made with the same cutting tool 1, which also carried out the finishing process. The produced tooth formation has a contour axis, which coincides with the axis of rotation of the workpiece spindle. The production of the rough tooth formation can be carried out without considering the radial run-out error and/or the pitch error of the cutting tool 1. It is also possible, however, to already compensate the radial run-out error and the pitch error of the cutting tool 1 in response to the rough tooth formation by means of the above-described corrective movements. According to the invention, the radial run-out error and the pitch error of the cutting tool 1 is considered by means of the above-described corrective movements, at least in response to the finishing step.

The above remarks serve to explain the inventions captured by the application as a whole, which further develop the prior art at least by means of the following feature combinations, in each case also independently, namely:

A method, which is characterized in that before the workpiece is machined, a radial run-out error 7 and/or a pitch error 8, 9 of the cutting tool 1 is determined and the flank line shape errors 18 of the right and/or left tooth flank 13, 14 resulting from the radial run-out error 7 and/or the pitch error 8, 9 are reduced by means of a periodic non-linearity of the coupling ratio $\varphi_1$, $\varphi_2$ and/or by means of a periodic change in the axial distance a.

A method, which is characterized in that the position of the left and right cutting edges 3, 4 and of the head cutting edge 5 of the cutting wheel 1 clamped onto the workpiece spindle are measured.

A method, which is characterized in that the left and right tooth flanks 13, 14 are in each case fine-machined separately in consecutive operating steps.

A method, which is characterized in that the cutting tool is a hob peeling tool, which is advanced in the direction of extension of the tooth flanks 13, 14.

A method, which is characterized in that the tool spindle and the workpiece spindle are rotationally driven by electronically coupled electric individual drives.

A device, which is characterized in that the control device is equipped in such a way that the workpiece spindle and the tool spindle can driven with the periodically non-linear coupling ratio $\varphi_2/\varphi_1$ and/or the axial distance can be changed periodically by means of a run-out error 7 and/or pitch error 8, 9 determined before the workpiece is machined, of the cutting tool 1, which is connected to the tool spindle, so as to reduce the flank line shape errors 18, 19 of the right and left tooth flanks 13, 14 resulting from the run-out error 7 and the pitch error 8, 9.

A device, which is characterized in that the device is a machine tool, which has a housing, which supports the workpiece spindle and the tool spindle, and a measuring tool 21 is fastened to the housing in order to measure the position of the left and right cutting edges 3, 4 and of the head cutting edge 5 of a cutting wheel clamped onto the workpiece spindle.

The invention claimed is:

1. A method for producing a toothed workpiece gear comprising:
    clamping or fastening a workpiece gear to a workpiece spindle;
    clamping or fastening a cutting tool having cutting teeth to a tool spindle, each of the cutting teeth having a left and a right cutting edge;
    rotationally driving the tool spindle and the workpiece spindle at a coupling ratio of respective angles of rotation thereof and at an axial distance from each other;
    using the cutting tool to simultaneously form a left and a right tooth flank of a tooth of the workpiece gear using the respective left and right cutting edges of the cutting teeth in a chip-removing manner;
    determining a radial run-out error and a pitch error of the cutting tool before a workpiece is machined;
    reducing at least one flank line shape error of the right and left tooth flank resulting from the radial run-out error and the pitch error by periodically changing the coupling ratio or by periodically changing the axial distance based on the radial run-out error and the pitch error; and
    measuring a position of the left and right cutting edges of the cutting teeth of the cutting tool clamped onto the spindle.

2. The method according to claim 1, wherein the cutting tool is a hob peeling tool, which is advanced in a direction of extension of the left and the right tooth flanks.

3. The method according to claim 1, wherein a position of a cutting edge of the cutting tool clamped onto the tool spindle is measured.

4. The method according to claim 1, wherein the tool spindle and the workpiece spindle are rotationally driven by electronically coupled electric individual drives.

5. The method according to claim 1, wherein a position of a cutting edge of the cutting tool is carried out by a measuring tool arranged on a machine housing or a machine frame.

6. A device for producing a toothed workpiece gear comprising:
    a workpiece spindle for clamping a workpiece gear;
    a tool spindle for clamping a cutting tool having cutting teeth, each of the cutting teeth having a left and a right cutting edge; and
    a control device;
    wherein the tool spindle and the workpiece spindle are rotationally driven at a coupling ratio of respective angles of rotation thereof and at an axial distance from each other, so that the cutting tool simultaneously forms a left and a right tooth flank a tooth of the workpiece gear using a left and a right cutting edge in a chip-removing manner;
    wherein the control device is equipped in such a way that, by means of a radial run-out error and a pitch error of the cutting tool, which is determined before the workpiece gear is machined, the workpiece spindle and the tool spindle are driven with coupling ratio that periodically changes or an axial distance that periodically changes to reduce at least one flank line shape error of the right and left tooth flanks resulting from the radial run-out error and the pitch error; and wherein the control device is equipped in such a way that a position of the left and right cutting edges of the cutting tool clamped onto the tool spindle are measured and the left and right tooth flanks are in each case fine-machined separately in consecutive operating steps.

7. The device according to claim 6, wherein the device is a machine tool, including a housing, which supports the workpiece spindle and the tool spindle, and a measuring tool is fastened to the housing in order to measure a position of the left and right cutting edges or of a cutting edge of a cutting wheel clamped onto the workpiece spindle.

8. A device for producing a toothed workpiece gear comprising:
- a workpiece spindle for clamping a workpiece gear;
- a tool spindle for clamping a cutting tool having cutting teeth, each of the cutting teeth having a left and a right cutting edge; and
- a control device;

wherein the tool spindle and the workpiece spindle are rotationally driven at a coupling ratio of respective angles of rotation thereof and at an axial distance from each other, so that the cutting tool simultaneously forms a left and a right tooth flank of a tooth of the workpiece gear using a left and a right cutting edge in a chip-removing manner;

wherein the control device is equipped in such a way that, by means of a radial run-out error and a pitch error of the cutting tool, which is determined before the workpiece gear is machined, the workpiece spindle and the tool spindle are driven with coupling ratio that periodically changes or an axial distance that periodically changes to reduce at least one flank line shape error of the right and left tooth flanks resulting from the radial run-out error and the pitch error; and wherein a measuring tool, by means of which the position of the left and of the right cutting edge is measured, is fastened to a housing of the device.

* * * * *